United States Patent Office 2,722,145
Patented Nov. 1, 1955

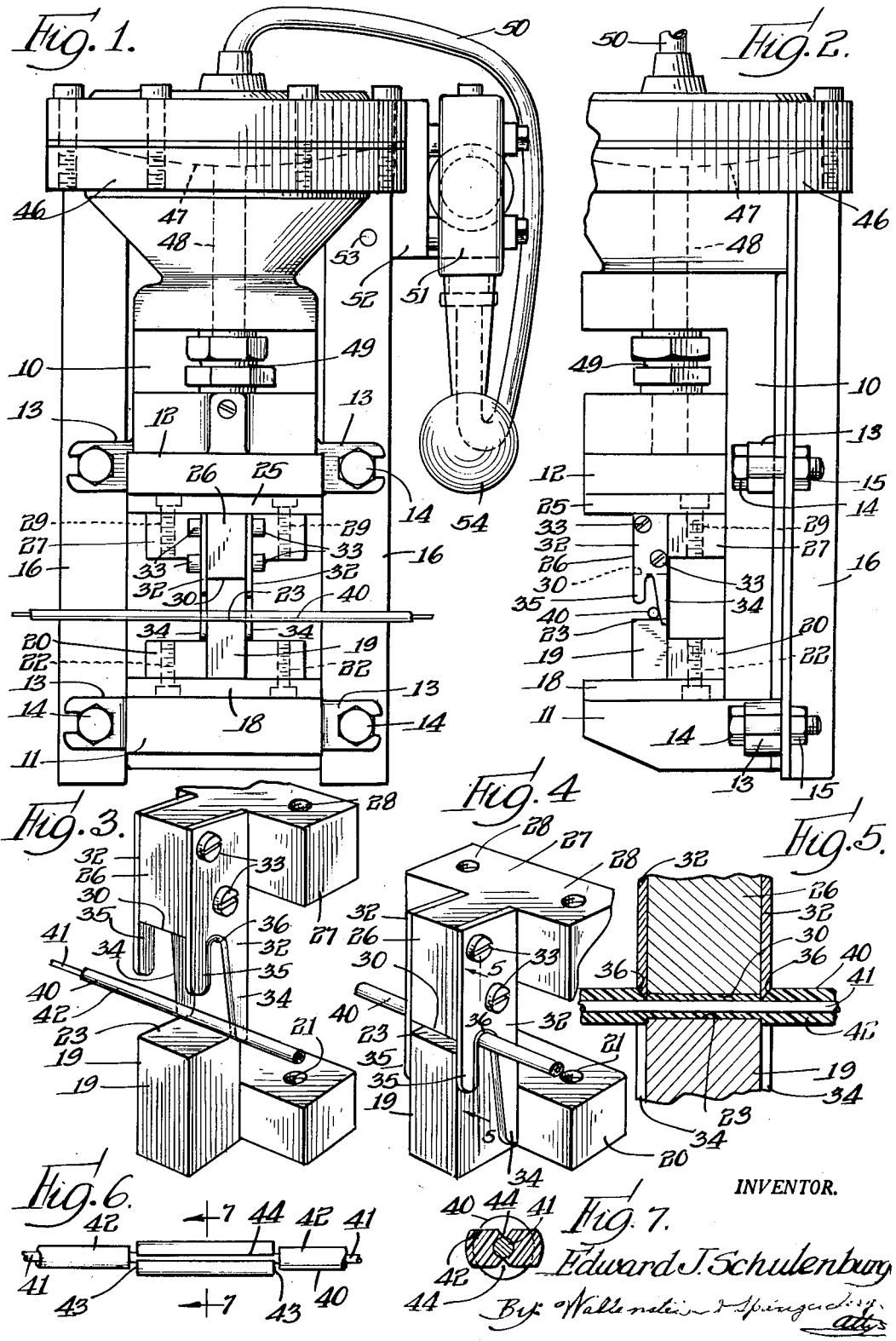

2,722,145

APPARATUS FOR STRIPPING INSULATION FROM INSULATED WIRE

Edward J. Schulenburg, Danville, Ill.

Application April 29, 1954, Serial No. 426,451

3 Claims. (Cl. 81—9.51)

This invention is directed to a method and apparatus for stripping insulation from insulated wire. In the electric sign field and other fields it is necessary to strip sections of insulation at spaced intervals along an insulated wire for the purpose of making plural electrical connections thereto. This stripping of the insulation by known methods is time consuming and expensive.

An object of this invention is to provide an improved method of stripping sections of insulation from insulated wire. Briefly, the method includes placing the insulated wire between a pair of flat anvils, cutting the insulation with cutter knives at spaced apart points corresponding to the ends of the anvils, bringing the two anvils together to smash the insulation therebetween and cause the same to split lengthwise between the spaced apart points, and removing the insulated wire from between the anvils and stripping the smashed and split section of insulation from the wire between the two spaced apart points. This operation may be repeated for stripping further sections of insulation from the insulated wire as desired.

Another object of this invention is to provide an improved apparatus for facilitating the stripping of sections of insulation from the insulated wire. Here, the apparatus includes a pair of opposed and relatively movable flat anvils receiving the insulated wire therebetween, and a U-shaped cutter knife transversely secured to each end of one of the anvils and receiving therein at spaced apart points the insulated wire. Means are provided for moving the anvils toward each other to cause the cutter knives to cut the insulation at the spaced apart points and to smash the insulation between the spaced apart points for causing the insulation to split lengthwise between the spaced apart points, whereby the cut, smashed and split insulation may be readily stripped from the wire. The apparatus may be used for stripping further sections of insulation along the insulated wire as desired. The apparatus of this invention operates automatically to perform the stripping method in a reliable, rapid and inexpensive manner, thereby obviating the aforementioned difficulties existent in the art.

Further objects of this invention reside in the method steps and the details of construction of the apparatus and in the cooperative relationships between the method steps and the component parts of the apparatus.

Other objects and advantages of this invention will become apparent to those skilled in the art upon reference to the accompanying specification, claims and drawing, in which:

Fig. 1 is a front elevational view of an apparatus made in accordance with this invention;

Fig. 2 is a side elevational view of the apparatus with parts broken away;

Fig. 3 is a perspective view of the opposed flat anvils and the U-shaped cutter knives with the anvils separated;

Fig. 4 is a perspective view similar to Fig. 3 but illustrating the anvils brought together;

Fig. 5 is a sectional view taken substantially along the line 5—5 of Fig. 4;

Fig. 6 is a top plan view of the insulated wire showing the insulation being cut, smashed and split lengthwise by the apparatus of this invention;

Fig. 7 is a vertical sectional view through the cut, smashed and split insulation and taken substantially along the line 7—7 of Fig. 6.

Referring first to Figs. 1 and 2, the apparatus of this invention may include a frame 10 having a bed 11 and a head 12 slidably mounted on the frame. The frame 10 may be provided with a plurality of mounting ears 13 by which the frame 10 is secured by bolts 14 and nuts 15 to supporting members 16.

The apparatus of this invention includes a plate 18 which may be suitably mounted in any desired manner on the stationary bed 11 of the frame 10. An anvil 19, having an integral mounting bar 20 provided with holes 21, is secured to the plate 18 by screws 22. The anvil 19, which is the stationary anvil, is provided with an upper flat surface 23. The apparatus of this invention also includes a plate 25 which may be secured in any desired manner to the head 12. An anvil 26, having a mounting bar 27 provided with holes 28, is secured by screws 29 to the plate 25. This anvil 26, which is movable, is provided with a flat downwardly facing face 30 which overlies the flat face 23 of the stationary anvil 19. When the head 12 is moved upwardly and downwardly the anvil 26 is retracted from and moved toward the stationary anvil 19.

The apparatus of this invention also includes a pair of U-shaped cutter knives 32 which are secured by screws 33 to the ends of the anvil 26. Each of these cutter knives 32 includes a long leg 34 and a short leg 35. The inner edges of the legs 34 and 35 are sharpened to provide cutting edges, these cutting edges forming a substantially V-shaped slot 36. The bottom of the slot 36 is substantially in alignment with the flat surface 30 of the anvil 26, it preferably projecting slightly therebeyond as illustrated in Fig. 5. The short legs 35 of the cutter knives 32 are spaced from the stationary anvil 19 when the movable anvil 26 is retracted or raised as is shown in Figs. 2 and 3. This allows the insulated wire to be readily inserted between the anvils 19 and 26. The long legs 34 of the cutter knives 32, however, extend beyond the upper flat surface 23 of the stationary anvil 19 when the movable anvil 26 is raised or retracted. Under these conditions, the long legs 34 operate as guides for the insulated wire when the same is inserted between the two anvils 19 and 26 as is clearly shown in Figs. 2 and 3. When the anvils 26 and 19 are brought together by lowering the upper anvil 26, as illustrated in Fig. 4, both the long legs and short legs 34 and 35, respectively, of the cutter knives extend over the anvil 19 so that the insulated wire is firmly and positively guided thereby.

The insulated wire which is to have sections of insulation stripped therefrom is generally designated at 40. It includes a metallic wire 41 and electrical insulation 42 of conventional construction. When the insulated wire 40 is placed between the anvils 19 and 26 and the upper anvil 26 is lowered, the cutter knives 32 operate to cut the insulation at spaced apart points around the majority of the wire 41. This cutting of the insulation 42 at these spaced apart points is indicated at 43 in Fig. 6. The cutters 32 are so arranged that while they cut the insulation they do not nick the wire 41. At the same time, the flat surfaces 23 and 30 of the anvils 19 and 26 smash the insulation 42 between the spaced apart points. This smashing of the insulation 42 causes the insulation to split lengthwise between the spaced apart points at the top and bottom of the wire as indicated at 44 in Figs. 6 and 7. This smashing action also causes the cuts 43 at the spaced apart points to completely encircle the wire 41. Thus the cuts 43 and the splits 44 in the insulation 42 are substantially continuous and communicate with each other. As a result, the smashed, cut and split insulation between the spaced apart points may be readily stripped from the wire 41 after the movable anvil 26 has been raised and the insulated wire withdrawn from between the anvils 19 and 26. To strip insulation from the insulated wire at intervals along the insulated wire, all that is necessary is to insert desired portions of the insulated wire between the anvils 19 and 26 and then repeat the above operation.

Any suitable means may be utilized for raising and lowering the upper anvil 26, such as an air cylinder, punch press, electric solenoid or a hand tool as desired.

For purposes of specific illustration herein, an air cylinder arrangement is disclosed. Here, an air cylinder 46 is suitably carried by the frame 10 and is provided with the usual diaphragm 47 and operating rod 48. The operating rod 48 is connected to the movable head 12 by means of a suitable coupling 49. The diaphragm 47 and hence the movable head 12 may be biased upwardly by means of a spring, not shown. The diaphragm 47 and hence the movable head 12 may be positively moved downwardly by means of air pressure above the diaphragm 47 which is conducted thereto by a conduit 50 under the control of a valve 51. The valve 51 may be connected by a bracket 52 and screws 53 to the supporting member 16. The valve 51 may be provided with an operating handle 54 which, when it is depressed supplies air to the air cylinder to lower the upper movable anvil 26 and which, when released discharges air from the air cylinder to allow the spring means to raise the upper anvil 26.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. An apparatus for facilitating the stripping of insulation from an insulated wire comprising, a pair of opposed flat anvils receiving the insulated wire therebetween and relatively movable between a first position wherein the anvils are close together and a second position wherein the anvils are separated apart, a U-shaped cutter knife transversely secured to each end of one of the anvils and receiving therein at spaced apart points the insulated wire, one of the legs of each U-shaped cutter knife extending short of the other anvil when the anvils are in the second position to allow insertion of the insulated wire between the anvils and the other leg of each U-shaped cutter knife extending beyond the other anvil when the anvils are in the second position for guiding the insulated wire between the anvils, and means for relatively moving the anvils from the second position to the first position to cause the cutter knives to cut the insulation at the spaced apart points and to smash the insulation between the spaced apart points for causing the insulation to split lengthwise between the spaced apart points whereby the cut, smashed and split insulation may be readily stripped from the wire.

2. An apparatus for facilitating the stripping of insulation from an insulated wire comprising, a pair of opposed flat anvils receiving the insulated wire therebetween, one of said anvils being stationary and the other anvil being movable toward and away from said one anvil, a U-shaped cutter knife transversely secured to each end of one of the anvils and receiving therein at spaced apart points the insulated wire, one of the legs of each U-shaped cutter knife extending short of the other anvil when the movable anvil is moved away from the stationary anvil to allow insertion of the insulated wire between the anvils and the other leg of each U-shaped cutter knife extending beyond the other anvil when the movable anvil is moved away from the stationary anvil for guiding the insulated wire between the anvils, and means for moving the movable anvil toward the stationary anvil to cause the cutter knives to cut the insulation at the spaced apart points and to smash the insulation between the spaced apart points for causing the insulation to split lengthwise between the spaced apart points whereby the cut, smashed and split insulation may be readily stripped from the wire.

3. An apparatus for facilitating the stripping of insulation from an insulated wire comprising, a pair of opposed flat anvils receiving the insulated wire therebetween, one of said anvils being stationary and the other anvil being movable toward and away from said one anvil, a U-shaped cutter knife transversely secured to each end of the movable anvil and receiving therein at spaced apart points the insulated wire, one of the legs of each U-shaped cutter knife extending short of the stationary anvil when the movable anvil is moved away from the stationary anvil to allow insertion of the insulated wire between the anvils and the other leg of each U-shaped cutter knife extending beyond the stationary anvil when the movable anvil is moved away from the stationary anvil for guiding the insulated wire between the anvils, and means for moving the movable anvil toward the stationary anvil to cause the cutter knives to cut the insulation at the spaced apart points and to smash the insulation between the spaced apart points for causing the insulation to split lengthwise between the spaced apart points whereby the cut, smashed and split insulation may be readily stripped from the wire.

References Cited in the file of this patent

UNITED STATES PATENTS

| | | |
|---|---|---|
| 878,493 | Barnes | Feb. 11, 1908 |
| 1,022,679 | Huston | Apr. 9, 1912 |